Aug. 8, 1967   A. VILET   3,334,489
ROCKET MOTOR
Filed June 2, 1965   3 Sheets-Sheet 2

Inventor
Andre Vilet
Stevens, Davis, Miller & Mosher
Attorneys

Aug. 8, 1967 A. VILET 3,334,489
ROCKET MOTOR
Filed June 2, 1965 3 Sheets-Sheet 3
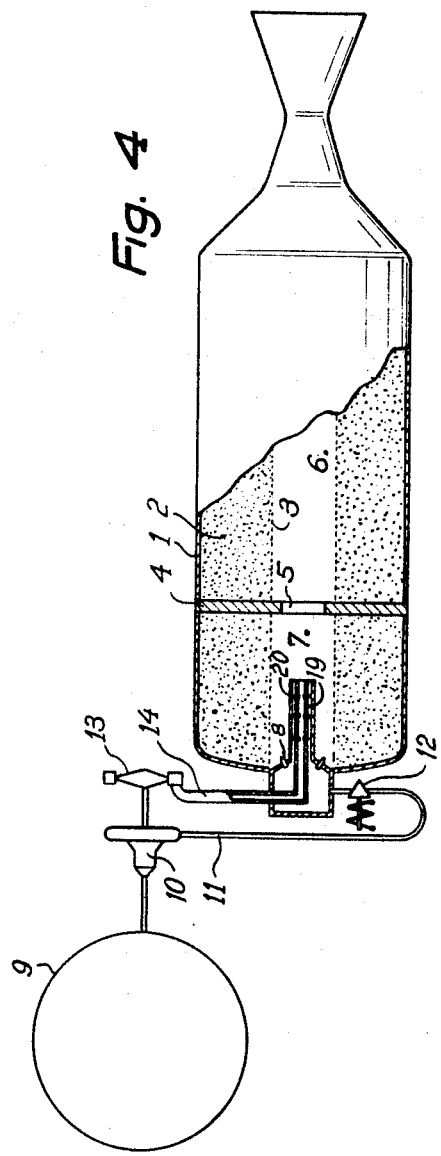
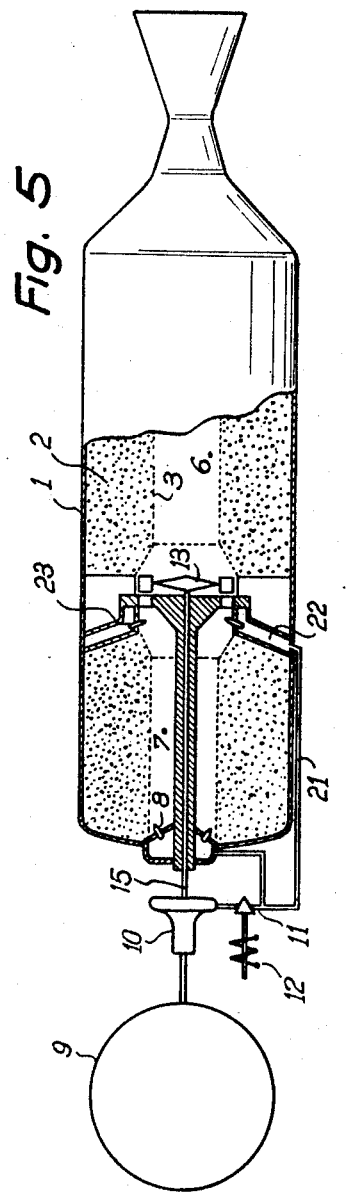
Inventor
Andre Vilet
Stevens, Davis, Miller & Mosher
Attorneys

3,334,489
ROCKET MOTOR

André Vilet, Sceaux, France, assignor to Societe Anonyme: Societe d'Etude de la Propulsion par Reaction, Villejuif, France
Filed June 2, 1965, Ser. No. 460,691
Claims priority, application France, June 4, 1964, 976,993
7 Claims. (Cl. 60—251)

This invention relates to rocket motion.

Hybrid rocket motors, which have already been suggested, operate by chemical reaction between an oxidant fluid and a combustible solid. They include a casing ending in a nozzle, and containing a solid block of combustible material within which there is a cavity constituting a combustion chamber. Injectors directed into this cavity permit the introduction of the oxidant fluid, supplied from a pressurized reservoir constituting a source of gas under pressure. This arrangement means that the reservoirs must be dimensioned accordingly and this leads to a prohibitive increase in weight which becomes ever more important with increase in the thrust and the time of operation of the rocket.

It is an object of the present invention to provide an improved rocket motor.

Certain embodiments of rockets in accordance with the invention will now be described, by way of example, with reference to the accompanying diagrammatic drawing, in which.

FIGURE 4 shows an embodiment according to which the turbine is situated externally to the combustion chamber, a fraction of the oxidant being utilised for cooling the gas drawn off from the combustion chamber before passing through the turbine; and FIGURE 5 shows an embodiment in which the turbine is placed in the combustion chamber, the gases which drive it being cooled by a secondary injection of oxidant liquid.

Figure 1:
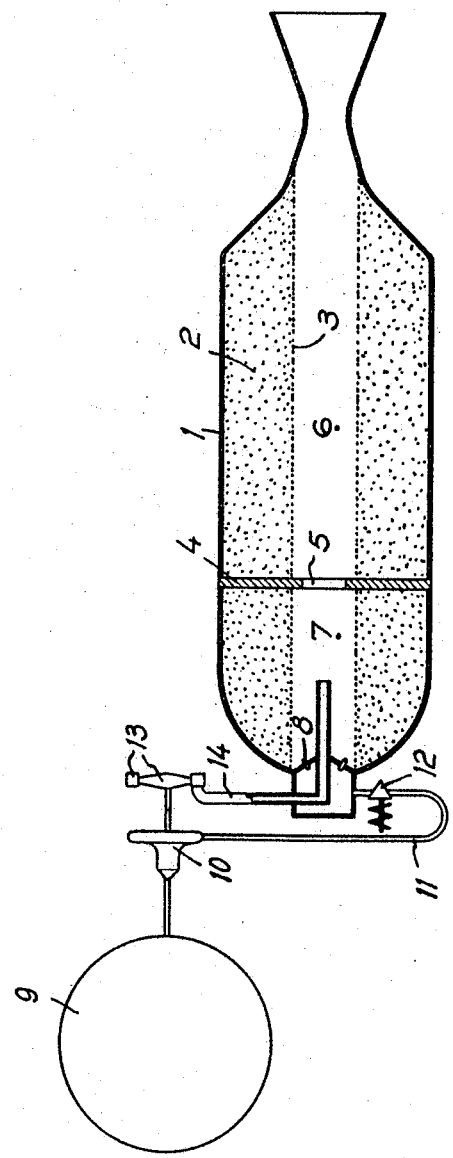
FIGURE 1 is a longitudinal section of a rocket motor in accordance with the invention, a turbine of which is arranged externally of a combustion chamber.

Referring to FIGURE 1, the rocket motor comprises a casing 1 containing a block of combustible solid 2 having a central passage 3. A partition 4 with a central orifice 5 is provided upstream of the combustion chamber itself 6 and an ante-chamber 7 in which an injection device 8 discharges is arranged upstream of the partition 4.

A supply of oxidant liquid is stored in a reservoir 9 which is fed to the injectors 8 by a pump 10 interposed in a pipe 11 provided with a control valve 12. The pump 10 is driven by a turbine 13 supplied through a duct 14 with gas generated in the ante-chamber 7. Starting is effected by initial pressurization of the reservoir to a low pressure. The partition 4 which has already justified its existence for purposes of combustion in a standard pressurized rocket motor has here a supplementary reason for its existence: the central orifice 5, by causing a small pressure loss, serves as the equivalent of a non-return valve, and the gases which are at any given instant in the ante-chamber 7, contain a considerable proportion of vaporized liquid which has not yet had time to enter into the reaction. Because of this, by a careful choice of the positioning of the partition 4 and of the length of the duct 14 it is possible to draw off gas at a relatively low temperature, compatible with satisfactory operation of the turbine 13.

Figure 2:
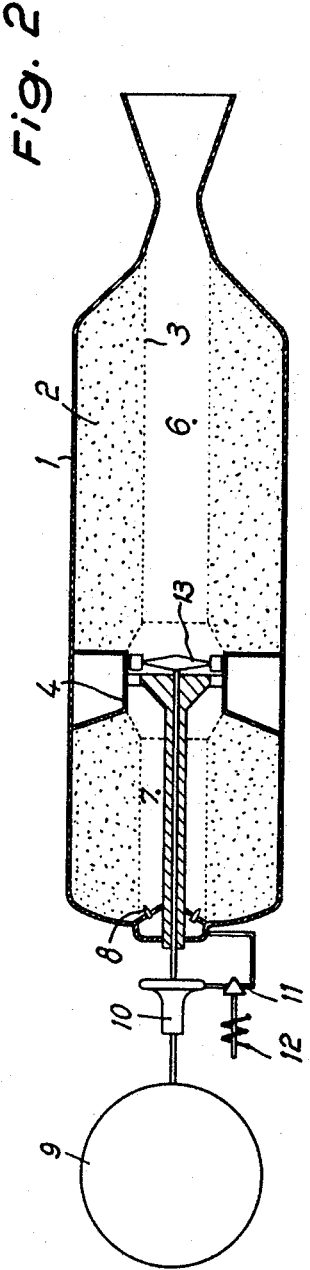
FIGURE 2 is a longitudinal section of a second embodiment, the turbine of which is arranged in the combustion chamber itself.

In FIGURE 2, the turbine 13 is disposed in the chamber itself and drives the pump 10 through a shaft 15.

It is to be noted that the fixed parts of the turbine (stator, distributor, casing, supports) take the place of the partition 4. The combustion conditions and the temperature of the gases are similar to those in the embodiment of FIGURE 1.

One important advantage of this embodiment which results from the use of a pump 10 for the oxidant, is the possibility of using the oxidant for effecting cooling by forced circulation in certain of the parts constituting the propulsion device, and this can be carried out without substantial loss of energy.

Figure 3:
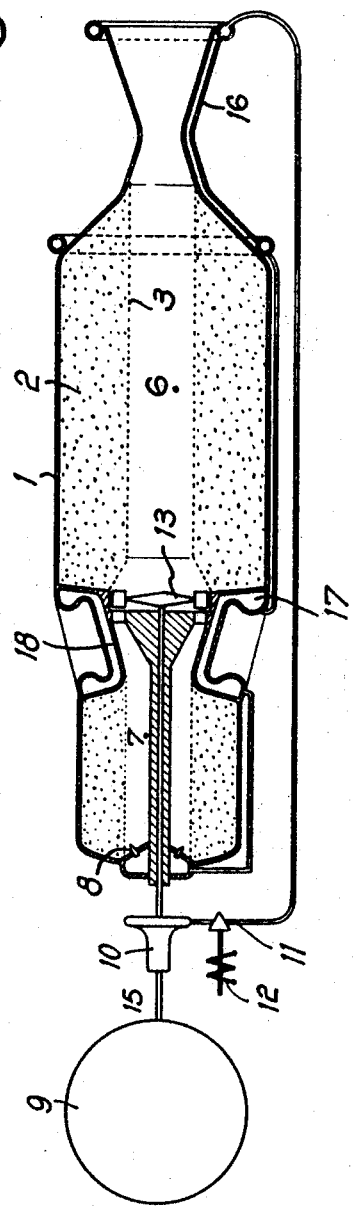
FIGURE 3 shows an embodiment in which the turbine is situated in the combustion chamber, means being provided for utilising a part of the oxidant for cooling purposes.

Thus, it can be seen that in FIGURE 3 a pipe 11 leads to an arrangement 16 for cooling the nozzle which is of a type known in itself. The pipe 11 also extends to a chamber 17 forming an integral part of the casing of the turbine. This allows cooling of structural parts of a gas mixing arrangement 18, also known in itself. Finally, the pipe 11 ends at the injection device 8.

In certain embodiments, it is possible that the gases do not take part directly in driving the turbine.

According to the invention, it is possible to artifically change the temperature of the gases.

Thus, in FIGURE 4, it is seen that the duct 14 comprises a concentric double wall thus forming an annular space 19 which communicates on the one hand with the injection device 8, and on the other hand with the interior of the duct 14 through the injectors 20. In this way, one fraction of the oxidant is injected into the duct 14, and on vaporizing, cools the gases collected in the ante-chamber 7 before their admission to the turbine 13.

In FIGURE 5, the cooling of the gases upstream of the turbine 13 is also effected by supplementary injection of oxidant by providing a pipe 21, an annular manifold 22 and injectors 23.

It is also possible to obtain the desired temperature of the gases for driving the turbine by choosing a particular lithergol (solid fuel) for the ante-chamber 7, so that the chemical reaction with the oxidant satisfied the desired conditions.

At the same time, it is possible to achieve the same result by limiting the surface of the ante-chamber 7 by the reduction, either of its length, or of its diameter, that is to say by adapting its form.

These solutions are valid whether the turbine is exterior or interior of the chamber.

It follows from the above description, that a rocket motor thus constructed gives rise in the majority of cases to an increase in the weight of the structure. However, the fact that the combustion chamber is fed by means of a pump allows the employment, without any disadvantages, of higher combustion pressures, and a forced circulation of the oxidant in the walls of the nozzle for cooling the latter.

The invention is not limited to the embodiments described and shown, but covers to the contrary all variations. In particular, the starting can be effected by other means than low pressurization of the reservoir 9 for example by an electrical or a pneumatic starter.

Furthermore, the cooling systems for the nozzle or other structures can be other than those described above.

What is claimed is:
1. In a rocket motor,
  casing means,
  partition means disposed along the length of the casing means and having an orifice therein,
  solid combustible material arranged within the casing means on both sides of the partition means and having passages therein communicating with the said orifice, the passage upstream of the orifice constituting an ante-chamber and the passage downstream of the orifice constituting a combustion chamber, injector means for injecting an oxidant into the ante-chamber, an oxidant pump having a delivery outlet, pipe means providing a path for the flow of oxidant from the pump delivery outlet to the injector means, turbine means coupled to the pump, duct means having an inlet and an outlet, the inlet being disposed within the ante-chamber and the outlet communicating with the turbine means, a sleeve surrounding that part of the duct means disposed within the ante-chamber and communicating with the pipe means, and further injector means mounted in the sleeve for the discharge of oxidant into the duct means, whereby the working fluid derived from the ante-chamber is cooled to a temperature acceptable to the turbine means.

2. A rocket motor comprising, an elongate casing, having upstream and downstream ends, a hollow turbine stator assembly intermediate the length of the casing, a turbine disc rotatable within the stator assembly, a shaft carrying the turbine rotor, a first solid fuel block mounted in the casing upstream of the turbine stator assembly and having a passage therein communicating with the turbine rotor and constituting an ante-chamber, a second solid fuel block mounted in the casing downstream of the turbine stator assembly and having a passage therein arranged to receive the turbine exhaust and constituting a combustion chamber, a nozzle assembly at the downstream end of the casing arranged to receive combustion products from the combustion chamber, injectors mounted in the upstream end of the casing and arranged to inject an oxidant into the ante-chamber, two annular pipes encircling the nozzle assembly, an oxidant pump coupled to the turbine rotor shaft and having an outlet, pipe means providing communication from the pump outlet to the said annular pipes, to the hollow stator assembly, and to the injectors, and valve means in the pipe means controlling the flow of oxidant therein.

3. In a rocket motor, casing means, outlet nozzle means at one end of the casing means, solid fuel in the casing means having a passage therethrough defining a chamber, injector means for injecting oxidant into the combustion chamber, pump means having an outlet, a turbine disc rotatably mounted in the said passage intermediate the length thereof and coupled to the pump means, that position of the passage upstream of the turbine means constituting an ante-chamber and that portion of the passage downstream of the turbine constituting a combustion chamber, a hollow stator structure surrounding the turbine disc, cooling means surrounding at least part of the outlet nozzle means, and pipe means providing communication between the outlet of the pump means, the cooling means, the hollow stator structure, and the injector means.

4. In a rocket motor casing means, partition means disposed along the length of the casing means and having an orifice therein, solid combustible material arranged within the casing means on both sides of the partition means and having passages therein communicating with the said orifice, the passage upstream of the orifice constituting an ante-chamber and the passage downstream of the orifice constituting a combustion chamber, said orifice having a smaller diameter than that of said passages, injector means for injecting an oxidant into the ante-chamber, an oxidant pump having a delivery outlet, pipe means providing a path for the flow of oxidant from the pump delivery outlet to the injector means, and turbine means coupled to the pump and receiving working fluid from the ante-chamber, said partition means being positioned with respect to said combustible material so that said ante-chamber is of a predetermined length for producing said working fluid in a condition acceptable to the turbine.

5. In a rocket motor casing means, solid fuel arranged within the casing and having a passage therethrough, said passage having an upstream and a downstream end, injector means for injecting oxidant into the passage at the upstream end thereof, oxidant pump means communicating with the injector means, turbine means mounted in the said passage intermediate the length thereof, that portion of the passage upstream of the turbine means constituting a combustion chamber, a stator structure surrounding the turbine means, and shaft means coupling the turbine means and the oxidant pump means.

6. In a rocket motor, casing means, partition means dividing the casing means intermediate the length thereof and having an orifice therein, combustible material arranged in the casing means on both sides of the partition means and having a passage therethrough aligned with the said orifice, that part of the passage upstream of the orifice constituting an ante-chamber and that part of the passage downstream of the orifice constituting a combustion chamber, said orifice being of a size for restricting flow from said ante-chamber to said combustion chamber, injector means arranged to inject oxidant into the ante-chamber, oxidant pump means connected to supply the injector means, and turbine means arranged to be driven by combustion products from the ante-chamber, the surface of the solid combustible material in the ante-chamber being selectively limited to a predetermined area for producing combustion products at a temperature acceptable to the turbine means.

7. In a rocket motor casing means, outlet nozzle means at one end of the casing means, solid fuel in the casing means having a passage therethrough defining a chamber, injector means for injecting oxidant into the combustion chamber, pump means having an outlet, a turbine disc rotatably mounted in the said passage intermediate the length thereof and coupled to the pump means, that position of the passage upstream of the turbine means constituting an ante-chamber and that portion of the passage downstream of the turbine constituting a combustion chamber, a hollow stator structure surrounding the turbine disc, cooling means immediately upstream of said stator structure, and pipe means providing communication between the outlet of the pump means, the cooling means, and the injector means.

References Cited

UNITED STATES PATENTS

| | | | |
|---|---|---|---|
| 2,585,626 | 2/1952 | Chilton | 60—35.6 |
| 2,711,629 | 6/1955 | Schapker | 60—35.6 |
| 3,065,598 | 11/1962 | Schultz | 60—35.6 |
| 3,127,739 | 4/1964 | Miller | 60—35.6 |
| 3,144,751 | 8/1964 | Blackman et al. | 60—35.6 |
| 3,173,251 | 3/1965 | Allen et al. | 60—35.6 |
| 3,178,885 | 4/1965 | Loughran | 60—39.48 X |
| 3,214,906 | 11/1965 | Coleal | 60—35.6 |

CARLTON R. CROYLE, *Primary Examiner.*